United States Patent
Suzuki et al.

(10) Patent No.: US 6,194,806 B1
(45) Date of Patent: Feb. 27, 2001

(54) COMPACT CYLINDRICAL RADIAL GAP TYPE MOTOR

(75) Inventors: Yuzuru Suzuki; Sakae Fujitani; Yoshiyuki Aono; Masaki Kagawa, all of Shizuoka-ken (JP)

(73) Assignee: Minebea Co., Limited, Nagano-ken (JP)

( * ) Notice: Subject to any disclaimer, the term of this patent is extended or adjusted under 35 U.S.C. 154(b) by 0 days.

(21) Appl. No.: 09/328,372

(22) Filed: Jun. 9, 1999

(30) Foreign Application Priority Data

Jun. 9, 1998 (JP) .................................. 10-159787

(51) Int. Cl.[7] .............................. H02K 1/00; H02K 1/12; H02K 1/24
(52) U.S. Cl. ......................... 310/269; 310/216; 310/259
(58) Field of Search ..................... 310/269, 216, 310/217, 218, 166, 168, 259, 258, 254, 261, 44

(56) References Cited

U.S. PATENT DOCUMENTS

| | | | |
|---|---|---|---|
| 2,298,388 | * 10/1942 | Knobel | 310/218 |
| 4,503,368 | * 3/1985 | Sakamoto | 310/49 R |
| 4,780,636 | * 10/1988 | Gandhi et al. | 310/216 |
| 4,947,065 | * 8/1990 | Ward et al. | 310/44 |
| 5,162,684 | * 11/1992 | Hayakawa | 310/154 |
| 5,369,325 | * 11/1994 | Nagate et al. | 310/156 |
| 5,493,161 | * 2/1996 | Uno et al. | 310/156 |
| 5,498,917 | * 3/1996 | Ninomiya et al. | 310/216 |
| 5,783,880 | * 7/1998 | Teshima et al. | 310/67 R |

* cited by examiner

Primary Examiner—Nestor Ramirez
Assistant Examiner—Dang Dinh Le
(74) Attorney, Agent, or Firm—Staas & Halsey LLP

(57) ABSTRACT

An iron core type cylindrical radial gap type motor structure, by having field magnetic poles generated by permanent magnets and, in opposition to these, salient poles generating a rotational magnetic field and arranged with their emission direction along the rotational axis, the shape of salient poles being approximately T-shaped in cross-section along the rotational axis direction, and I-shaped in cross-section at right angles to the rotational axis direction, the upper end of said T-shaped opposing the axial direction of the rotor magnets and the lower end being mechanically coupled and fixed to the stator ring, thus constructing the magnetic circuit of the armature, and where the relationship between the length L1 of the said salient pole in the axial direction opposed to the field magnetic pole, and the length L2 in the axial direction of the coil core section about which the coil is wrapped, satisfies the conditions $0.3*L1 \leq L2 \leq 0.6*L1$, and, furthermore, where the relationship between the thickness A1 of the said salient pole in the circumferential direction, and the pitch P of the field magnetic pole, satisfies the conditions $0.4*P \leq A1 \leq 0.8*P$.

11 Claims, 9 Drawing Sheets

COMPACT CYLINDRICAL RADIAL GAP TYPE MOTOR

BACKGROUND OF THE INVENTION

1. Field of the Invention

The present invention relates to a compact cylindrical radial gap type motor having a rotor comprised of permanent magnets, and more particularly, to a DC brushless motor in which the motor characteristics are improved by appropriate establishment of the form of the salient poles for a motor with a concentrated winding armature structure using a bobbin for each of the salient poles, said salient poles having a distributed structure.

2. Description of the Prior Art

Patent Application 306115 of 1998 describes a laminated, inner rotor type brushless DC motor structure in which the armature is constructed of a ring section and multiple salient pole sections, where the length of each salient pole in the axial direction is practically the same as the length of its opposing rotor magnet.

The invention described in Japanese Patent Application 306115 of 1998 does not explain the dimensional relationship between the lead winding section and the opposing section of the salient pole magnet, nor does it explain the dimensional relationship between the width in the circumferential direction of the salient pole and the rotor magnetic pole pitch. Accordingly, it has the drawback that it does not clearly indicate which shape of salient pole improves the motor efficiency. As a result, even though a unique armature structure is presented, there is the drawback that a suitable effect cannot be obtained.

SUMMARY OF THE INVENTION

The objective of the present invention, in order to overcome the above problem, proposes an active iron core type compact cylindrical radial gap type motor having field magnetic poles generated by permanent magnets and, in opposition to these, salient poles generating a rotational magnetic field and arranged with their emission direction along the rotational axis, and which does not employ the conventional laminated structure with cores of practically the same shape laminated in the axial direction, but which instead, by using an armature constructed of a stator ring section and multiple salient poles constructed radially, provides a high efficiency motor by using an appropriate salient pole shape.

In order to overcome the above-mentioned problem, the main present invention provides an iron core type cylindrical radial gap type motor structure characterized by having field magnetic poles generated by permanent magnets and, in opposition to these, salient poles generating a rotational magnetic field and arranged with their emission direction along the rotational axis, the shape of said salient poles being approximately T-shaped in cross-section along the rotational axis direction, and I-shaped in cross-section at right angles to the rotational axis direction, the upper end of said T-shaped opposing the axial direction of the rotor magnets and the lower end being mechanically coupled and fixed to the stator ring, thus constructing the magnetic circuit of the armature, and where the relationship between the length L1 of the said salient pole in the axial direction opposed to the field magnetic pole, and the length L2 in the axial direction of the coil core section about which the coil is wrapped, satisfies the conditions $0.3*L1<L2<0.6*L1$, and, furthermore, where the relationship between the thickness A1 of the said salient pole in the circumferential direction, and the pitch P of the field magnetic pole, satisfies the conditions $0.4*P<A1<0.8*P$.

The second invention of the present invention provides a compact cylindrical radial gap type motor structure as described in the above main invention, characterized by having salient poles made from electromagnetic steel plates laminated in the circumferential direction.

The third invention of the present invention provides a compact cylindrical radial gap type motor structure as described in the above main invention, characterized by having salient poles made from a soft magnetic substance composed of soft magnetic powder mixed into plastic resin.

The fourth invention of the present invention provides a compact cylindrical radial gap type motor structure as described in the above main invention, characterized by having field magnet poles made from permanent magnets which are formed from metallic alloy.

The fifth invention of the present invention provides a compact cylindrical radial gap type motor structure as described in the above main invention, characterized by having field magnet poles made from permanent magnets which are formed from a sintered magnetic substance.

The sixth invention of the present invention provides a compact cylindrical radial gap type motor structure as described in the above main invention, characterized by having field magnet poles made from permanent magnets which are formed from plastic magnets.

The seventh invention of the present invention provides a compact cylindrical radial gap type motor structure as described in above mentioned invention, characterized by having a rotor location detection magnet formed as a integrated with the field magnet poles, which are formed from plastic magnets.

The eighth invention of the present invention provides a compact cylindrical radial gap type motor structure as described in the above main invention, in which the motor has an inner rotor structure.

The ninth invention of the present invention provides a compact cylindrical radial gap type motor structure as described in the above main invention, in which the motor has an outer rotor structure.

DESCRIPTION OF THE PREFERRED EMBODIMENTS

Figure 1:
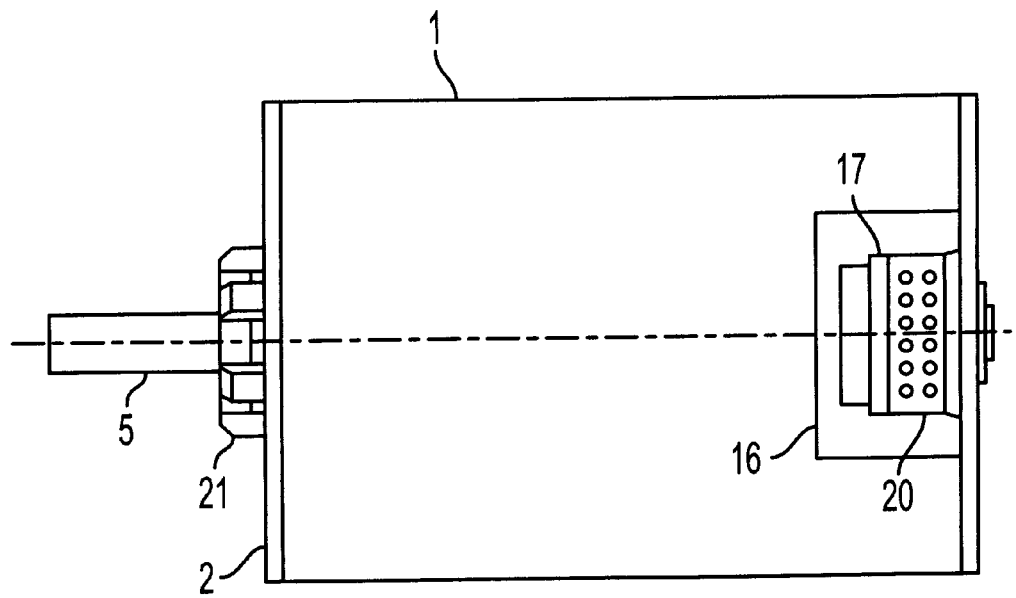
FIG. 1 is a side view showing an embodiment of the present invention.
Figure 2:
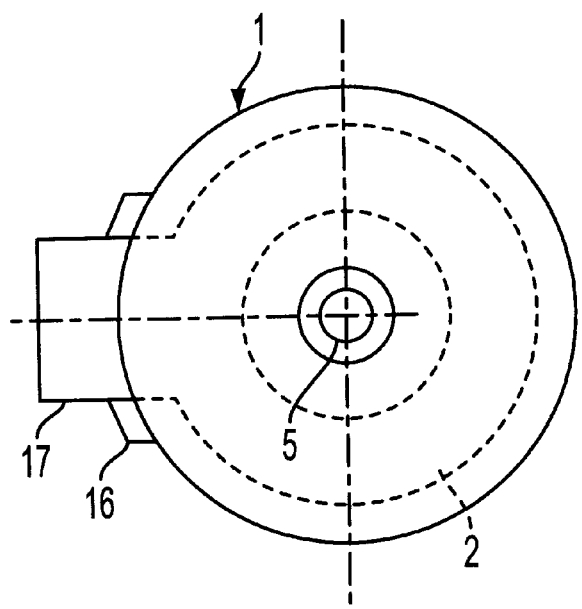
FIG. 2 is a front view showing an embodiment of the present invention.
Figure 3:
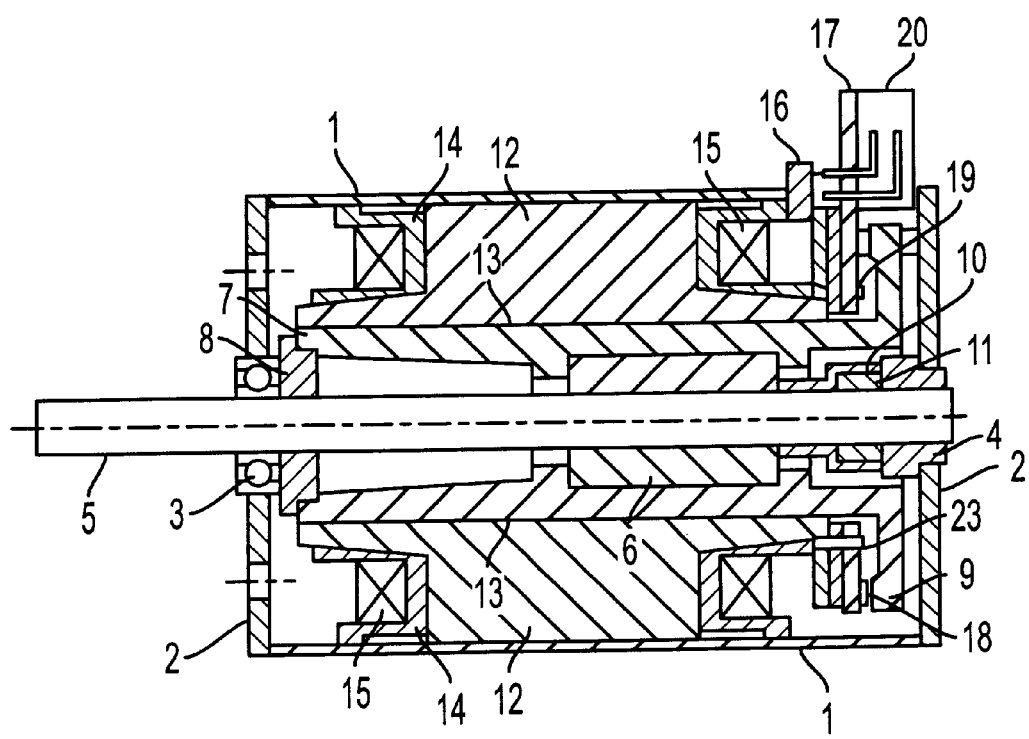
FIG. 3 is a cross-sectional view showing an embodiment of the present invention.

The first embodiment of the present invention will be described with reference to the explanatory diagrams. FIG. 1 is a side view showing the appearance of a 3-phase inner rotor type DC brushless motor having 6 salient poles and 8 rotor magnetic poles as related in the present invention, FIG. 2 is a front view of the same motor viewed from the axial direction, and FIG. 3 is a cross-sectional view along the axial direction. As can be seen from these diagrams, the 3-phase inner rotor type DC brushless motor related in the present invention is surrounded by a cylindrical stator ring 1. This stator ring 1 acts as a stator yoke. Flanges 2,2 are mounted on each end of stator ring 1. Bearings 3,4 are mounted in flanges 2,2 and these bearings 3,4 rotatably support the rotating shaft 5.

As shown in FIG. 3, rotating shaft 5 is fitted into a cylindrical sleeve 6 made from non-magnetic material, and rotor 7, which acts as the field magnet pole and is made from a rare earth synthetic resin type permanent magnet, encloses said sleeve 6. On the outer surface of this rotor 7 are 12 magnetic poles, lying along the rotational axis, alternately providing N and S poles around the circumference.

At one end of rotor 7, spacer 8 supports rotating shaft 5. At the other end of rotor 7, and forming a integrated with rotor 7, is a position detecting magnet 9, which acts to detect the rotational position of rotor 7. Around the outer circumferential surface of this position detecting magnet 9 are multiple magnetic poles, alternately N and S. Spring holder 10 is freely fitted onto rotating shaft 5, and coil spring 11 is interposed into the space between said spring holder 10 and bearing 4, thus applying pre-compression to bearing 3 with a bias toward the left side of FIG. 3. Rotor 7 may also use permanent magnets of the metal alloy or sintered type.

Mounted on the inner surface of stator ring 1 are 6 salient poles 12,12 which act as fixed magnetic poles. One of said salient poles 12 has a laminated structure composed of a plurality of T-shaped silicon steel plates, and its base part is bonded to the inner surface of stator ring 1. The upper face of the T shape is opposed to the outer surface of rotor 7, separated from it by small gap 13. Salient pole 12 passes through bobbin 14, around which is wrapped stator winding 15. Bobbin 14, stator winding 15 and salient pole 12 comprise one of the stator magnetic poles. The side ends of bobbin 14 are mounted on the plate shaped pin holder 16, and printed wiring board 17 is also mounted on this pin holder 16. Pin holder 16 is fitted with a through hole through which passes the terminal pin 19, fitted on bobbin 14, to make contact with the terminal section of printed wiring board 17. On printed wiring board 17, in addition to the electronic components of the motor drive circuit, are also mounted 3 Hall elements 18 which detect the position of the rotor in opposition to the plurality of magnets formed around the rim of position detecting magnet plate 9. On one part of printed wiring board 17 is mounted connector 20, and said connector 20 protrudes outside the stator ring. In FIGS. 1 and 2, numeral 16 denotes part of the pin holder, while in FIG. 1, numeral 21 denotes the bearing housing.

Figure 4:
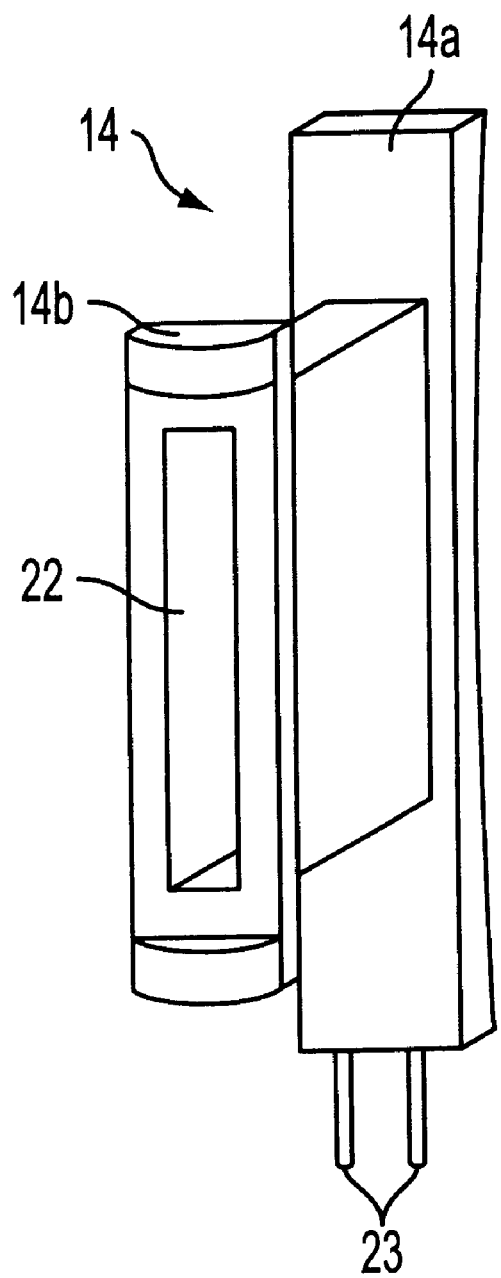
FIG. 4 is a perspective view of a bobbin.

The structure of the fixed magnetic poles provided by this embodiment will now be explained. First, as shown by FIG. 4, bobbin 14 has a rectangular hole 22 through its central section, said hole being either straight or having a tapering end shape, for the purpose of inserting the bottom part of the T-shaped salient pole. Furthermore, the bottom part of T-shaped salient pole 12 is contacted/fixed to stator ring 1. The armature (stator) is composed of a plurality of salient poles 12 (in this embodiment, 6) and stator ring 1. Bobbin 14 is formed from a single piece of synthetic resin, and has flanges 14a, 14b. Terminals 23 are inserted into the bottom edge of flange 14a, to which the coil ends of stator winding 15 can be tied.

Figure 5:
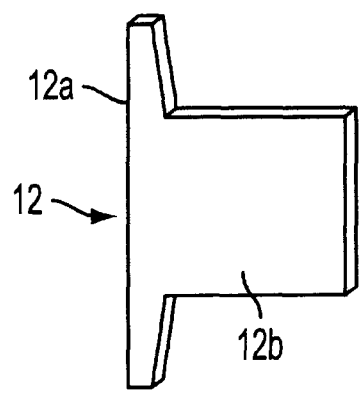
FIG. 5 is a perspective view showing one of the plates which is laminated to form the structure of a salient pole.
Figure 6:
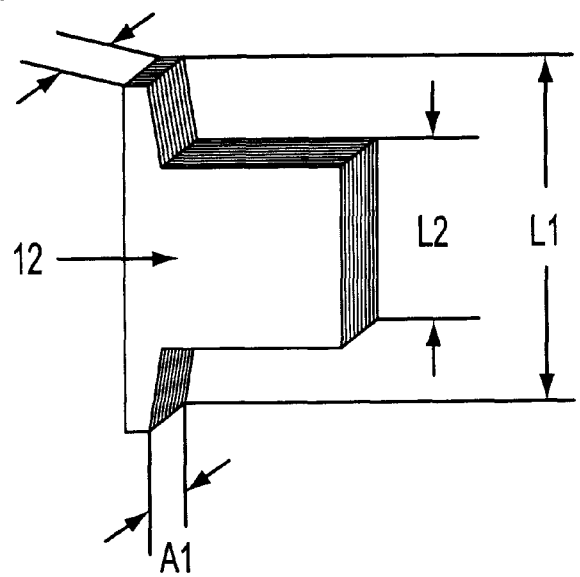
FIG. 6 is a perspective view showing a laminated salient pole.

FIG. 5 shows one sheet of salient pole 12 plates, and FIG. 6 shows 9 sheets of plates laminated together. In the preferred embodiment of the present invention, a laminated structure formed by laminating electrode steel plates as shown in FIG. 7 is inserted into the rectangular hole 22 in bobbin 14.

The shape of the salient pole is approximately T-shaped in cross-section along the rotational axis direction, and comprises 2 main parts. The upper part 12a of the T-shaped is arranged in the rotational axis direction, facing the permanent magnet which comprises rotor 7 and separated from it by a small air gap. 12b is narrower than 12a, and is the part which is surrounded by the stator winding wound around the bobbin. Incidentally, salient pole 12 is an I-shaped cross section when viewed in the circumferential direction (see FIG. 6), and there is no widening of its shape in the circumferential direction.

Figure 7:
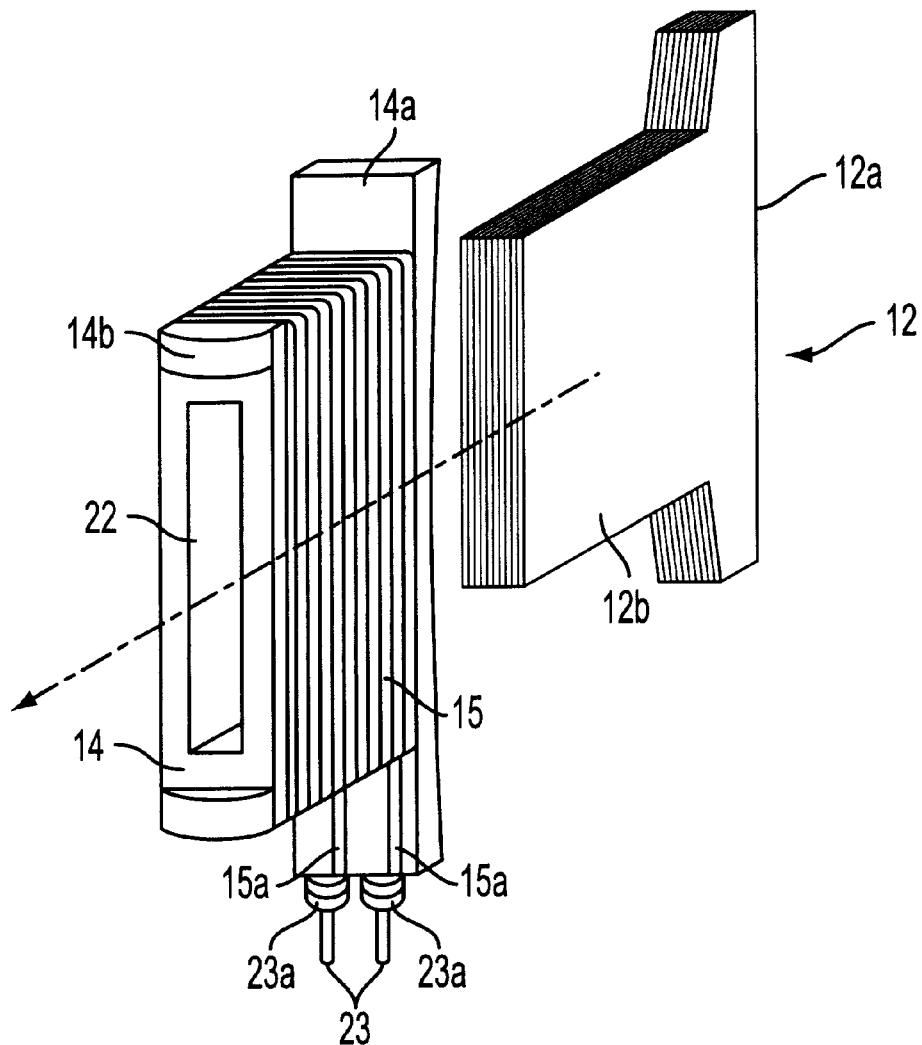
FIG. 7 is a decomposed perspective view of a salient pole and a bobbin wrapped with stator lead wire.

FIG. 7 shows the coil assembly with the stator winding wound around bobbin 14, and the way in which salient pole 12 is inserted into this. 23a are the projections for tying the coil ends. After the ends 15a of stator winding 15 have been tied, normally they are soldered in place. Salient pole 12 is inserted in the direction of the arrow in the diagram into rectangular hole 22. The salient pole 12 shown in FIG. 7 is composed of laminated electromagnetic steel plates, but other constructions may be used and provided that soft magnetic material is used. For example, a formed plastic part including soft magnetic powder could be employed.

Figure 8:
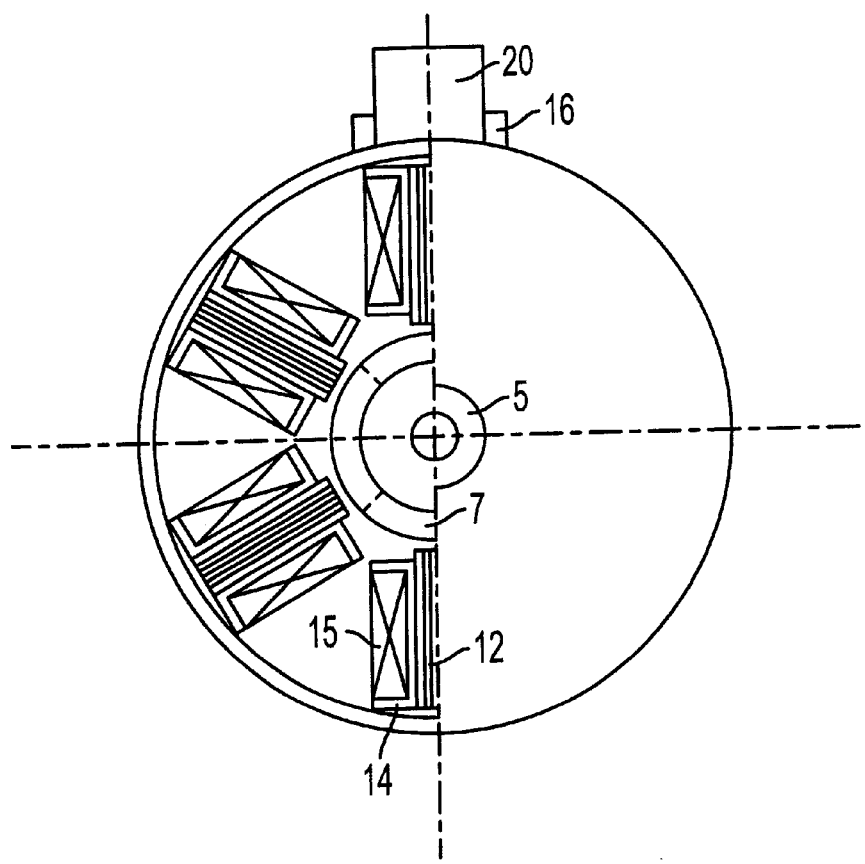
FIG. 8 is a partially cross-sectional front view, showing an embodiment of the present invention.

FIG. 8 is a partially cross-sectional front view showing an embodiment of the present invention. Explanations are omitted for those parts having the same numeric codes as parts explained in descriptions of previous diagrams. It can be easily understood from FIG. 8 that there are 6 fixed salient poles and 8 permanent magnets forming the poles of the rotor 7. Each salient pole 12 is constructed according to identical conditions (as shown in FIG. 6, a structure of nine 0.35 mm thick electromagnetic steel plates laminated together), and this embodiment comprises 6 salient poles 12 arranged radially at the same angles.

In conventional winding methods for inner rotor constructions, where the coils are directly wound on the core, the winding work is especially difficult. The structure provided by the present invention allows the coils to be wound separately on individual bobbins and thus significantly reduces the work of winding. In addition, where the motor is a DC brushless motor, it is possible to mount Hall elements for detecting rotor position on the printed wiring board, so all the electrical wiring can be done on printed wiring board 17, providing an extremely simple structure.

Now, the form of the salient poles 12, a major feature of the present invention, will be described. The embodiment of the present invention described above provides a motor structure for a 3-phase inner rotor type DC brushless motor have 6 salient poles and 8 rotor magnet poles. As shown in FIG. 3, the salient poles 12 are T-shaped. An explanation will now be given of the relationship between the length L1 in the axial direction (the upper part of the T: refer to FIG. 6) of the part which faces the permanent magnets of the rotor 7, and length L2 in the axial direction (refer to FIG. 6) of the winding core part, around which is wound the stator winding.

Figure 9:
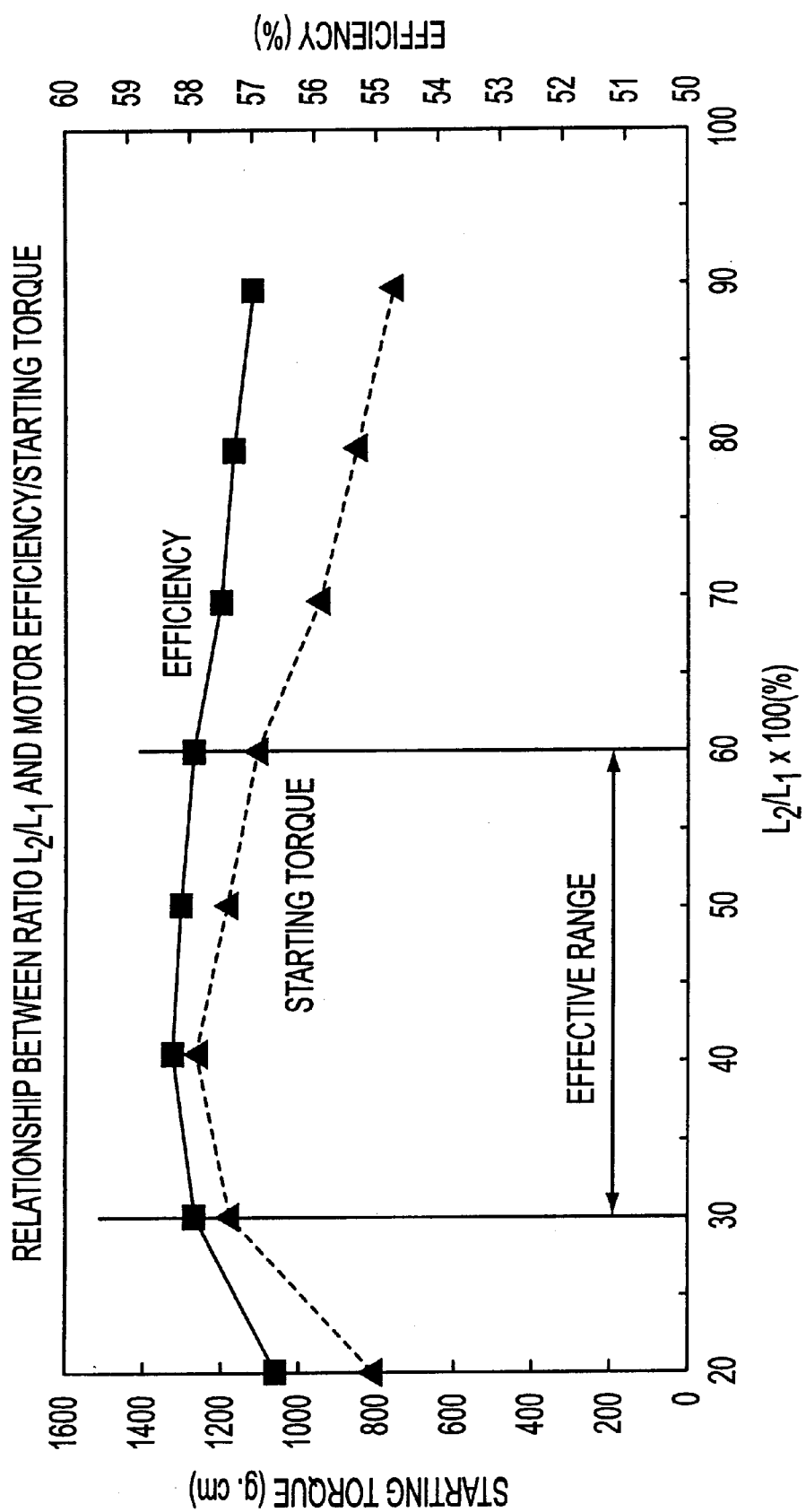
FIG. 9 is a graph showing the relationship between the ratio L2/L1 and motor efficiency/starting torque.

Tests and simulations were performed to determine the nature of this relationship, the results of which are shown in the graph in FIG. 9, which gives the relationship between efficiency and starting torque (important motor characteristics) using the above lengths L1 and L2 as parameters. FIG. 9 shows a graph which has a peak in the middle, showing the optimum value for the ratio between L1 and L2. When this ratio becomes too small, magnetic saturation will occur for the salient pole 12 (especially for the part L2), and when the ratio becomes too big, the winding resistance value will become too large. Accordingly, there is an optimum value for the ratio L2/L1 and if this ratio becomes too small or too large, the efficiency/torque will deteriorate. The graph in FIG. 9 shows that efficiency and starting torque are high over the range $0.3 \times L1 \leq L2 \leq 0.6 \times L1$.

In the embodiment described, L1=50 mm and L2=25 mm, giving a ratio of L2/L1=0.5, which is in the region of the highest value shown by the graph in FIG. 9. Furthermore, it is desirable that the length L1 in the axial direction of salient pole 12 should be equal to, or slightly shorter than, the length in the axial direction of the permanent magnets of rotor 7. The reason for this is that by so doing, the whole of the top part 12a of salient pole 12 (the top of the T) will be inside the even magnetic field produced by the rotor magnets, and thus will not be subject to the effect of unstable magnetic flux from the rotor permanent magnet edge surfaces (edge effect).

Figure 10:
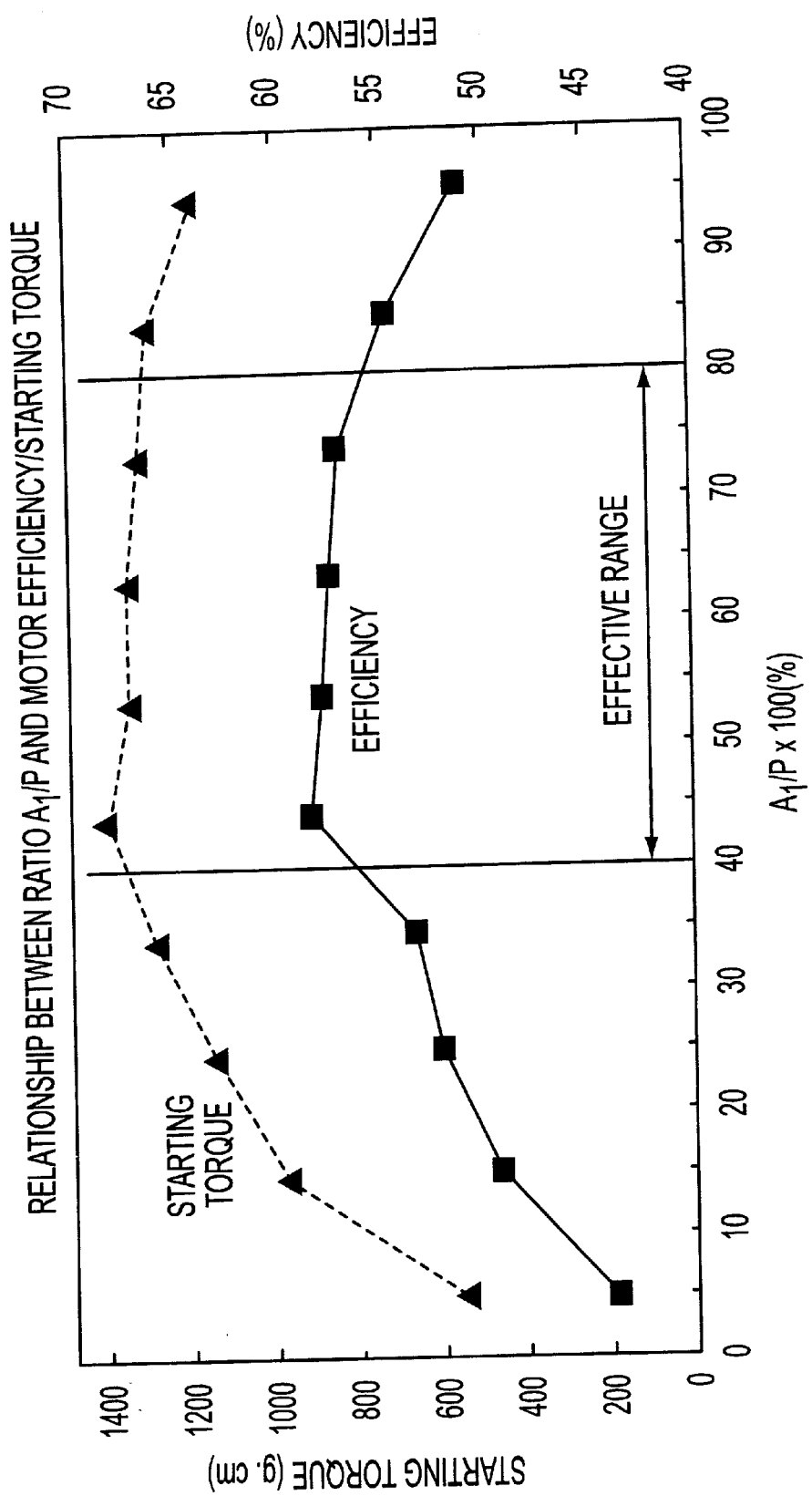
FIG. 10 is a graph showing the relationship between the ratio L2/P and motor efficiency/starting torque.

The relationship between the thickness A1 in the circumferential direction of salient pole 12 (the thickness of the lamination in FIG. 6) and the magnetic pole pitch P of the permanent magnets forming the rotor 7 will now be explained. In the same way as for the graph in FIG. 9, this relationship was determined by tests and simulations. The graph in FIG. 10 shows the relationship between the motor efficiency and starting torque, using as parameters the lamination thickness A1 of salient pole 12 and the pitch P of the permanent magnets forming the rotor 7. Similarly to the graph in FIG. 9, the graph in FIG. 10 shows a peak in the middle indicating the optimal values for the ratio of A1 and P. When this ratio becomes too small, magnetic saturation will occur for the salient pole 12 (especially for the part L2), and when the ratio becomes too big, there is not enough space for the winding in the circumferential direction. In either case, efficiency falls. The graph in FIG. 10 shows the best values of motor efficiency and starting torque to be found in the range $0.4 \times P \leq A1 \leq 0.8 \times P$. In the present embodiment, P=7.07 mm and A1=3.15 mm, giving a ratio of A1/P=0.446, which corresponds to the highest part of the graph in FIG. 10.

Figure 11:
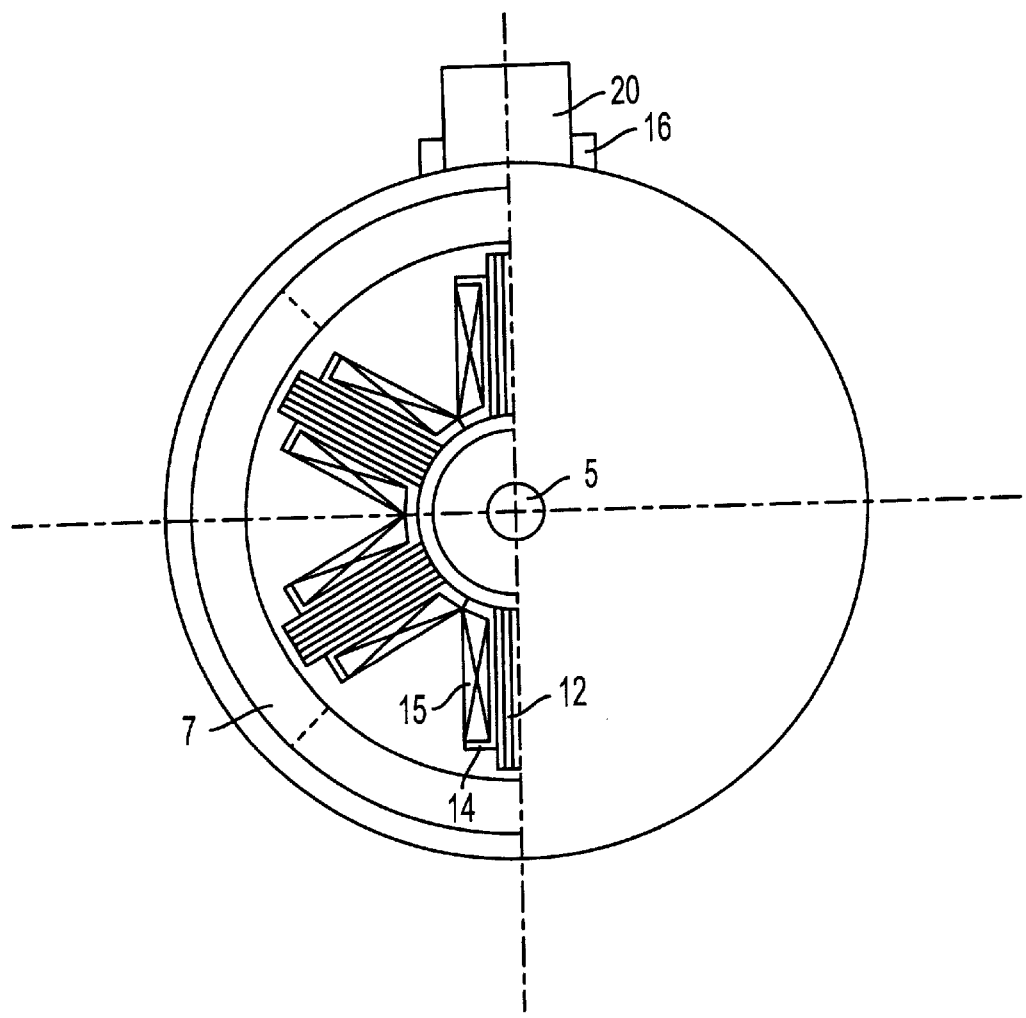
FIG. 11 is a cross-sectional view showing another embodiment of the present invention.

The present invention is applicable to outer rotor type DC brushless motors in the same way as to inner rotor types. An outer rotor type embodiments is shown in FIG. 11. In contrast to the inner rotor type embodiment described above, in which rotor 7 is arranged so as to freely rotate inside, with fixed magnetic poles and stator ring 1 arranged on its outside, the outer rotor type shown in FIG. 11 has an opposite arrangement with rotor 7 on the outside and the fixed magnetic poles and stator ring 1 arranged on the inside. Otherwise the arrangement is similar and the same numeric reference are used, so a detailed description is omitted.

The present invention has been described in terms of the above embodiment of a 3-phase inner rotor type DC brushless motor having 6 salient poles and 8 rotor magnetic poles but it is not restricted to this type of motor. For example, the present invention is also applicable to other types of motors such as permanent magnet type synchronous motors or permanent magnet type generators. Within the range of the gist of this invention various embodiments are possible, and such embodiments are not excluded from the scope of the present invention.

As described in detail above, the present invention provides a motor structure in which the salient poles are approximately T-shaped in cross-section along the rotational axis direction, and I-shaped in cross-section at right angles to the rotational axis direction, the upper end of said T-shape opposing the axial direction of the rotor magnets and the lower end being mechanically coupled and fixed to the stator ring, thus constructing the magnetic circuit of the armature, and in which, by setting the values of L1, L2, A1 and P such that the relationship between the length L1 of the said salient pole in the axial direction opposed to the field magnetic pole, and the length L2 in the axial direction of the coil core section about which the coil is wrapped, satisfies the conditions $0.3*L1 \leq L2 \leq 0.6*L1$, and the relationship between the thickness A1 of the said salient pole in the circumferential direction, and the pitch P of the field magnetic pole, satisfies the conditions $0.4*P \leq A1 \leq 0.8*P$, the possibility of magnetic saturation occurring is greatly reduced, copper loss is small, and a motor with good electromagnetic balance is accomplished. Furthermore, by employing a structure in which the salient poles are composed of electromagnetic steel plates laminated in the circumferential direction, iron loss is reduced and a motor with good efficiency is accomplished. In addition, if an inner rotor type of DC brushless motor type structure is employed, significant effects are achieved.

What is claimed is:

1. An iron core cylindrical radial gap motor structure characterized by having field magnetic poles generated by permanent magnets and having, in opposition to these, salient poles to generate a rotational magnetic field arranged with their emission direction along the rotational axis, a shape of each of the salient poles being approximately T-shaped in cross-section along a rotational axis direction, and I-shaped in cross-section at right angles to the rotational axis direction, an upper end of said T-shape opposing the axial direction of the field magnetic poles and a lower end being mechanically coupled and fixed to a stator ring, thus constructing a magnetic circuit of an armature, and where the relationship between a length L1 of each of the salient poles in the axial direction opposed to the field magnetic poles, and a length L2 in the axial direction of a coil core section about which a coil is wrapped, satisfies the conditions $0.3*L1 \leq L2 \leq 0.6*L1$, and, furthermore, where the relationship between a thickness A1 of each of the salient poles in the circumferential direction, and a pitch P of each of the field magnetic poles, satisfies the conditions $0.4*P \leq A1 \leq 0.8*P$.

2. An iron core type cylindrical radial gap motor structure according to claim 1, characterized by having the salient poles being made from electromagnetic steel plates laminated in the circumferential direction.

3. An iron core cylindrical radial gap motor structure according to claim 1, characterized by having the salient poles being made from a soft magnetic substance composed of soft magnetic powder mixed into plastic resin.

4. An iron core cylindrical radial gap motor structure according to claim 1, characterized by having the field magnet poles being made from permanent magnets which are formed from metallic alloy.

5. An iron core cylindrical radial gap motor structure according to claim 1, characterized by having the field magnet poles being made from permanent magnets which are formed from a sintered magnetic substance.

6. An iron core cylindrical radial gap motor structure according to claim 1, characterized by having the field magnet poles being made from permanent magnets which are formed from plastic magnets.

7. An iron core cylindrical radial gap motor structure according to claim 6, characterized by having the position detecting magnet being formed as a single piece with the field magnet poles, which are formed from plastic magnets.

8. An iron core cylindrical radial gap motor structure according to claim 1, wherein said motor further comprises an inner rotor structure.

9. An iron core cylindrical radial gap motor structure according to claim 1, wherein said motor further comprises an outer rotor structure.

10. An iron core radial gap motor, comprising:

a plurality of field effect magnetic poles; and a plurality of salient poles, the salient poles being arranged with their emission direction along a rotational axis, with a shape of each of the salient poles being approximately T-shaped in cross-section along the rotational axis direction, and I-shaped in cross-section at right angles to the rotational axis direction, an upper end of the T-shape opposing an axial direction of the plurality of field effect magnetic poles and a lower end being mechanically coupled to a stator ring, wherein a thickness A1 of the salient poles in a circumferential direction and a pitch P of each of the field magnetic poles satisfies the conditions $0.4*P \leq A1 \leq 0.8*P$.

11. The iron core radial gap motor of claim 10, wherein a length L1, of each of the salient poles in the axial direction opposed the field magnetic poles, and a length L2 in the axial direction of a coil core section, satisfies the conditions of $0.3*L1 \leq L2 \leq 0.6*L1$.

* * * * *